DENNIS C. WEST
INVENTOR.

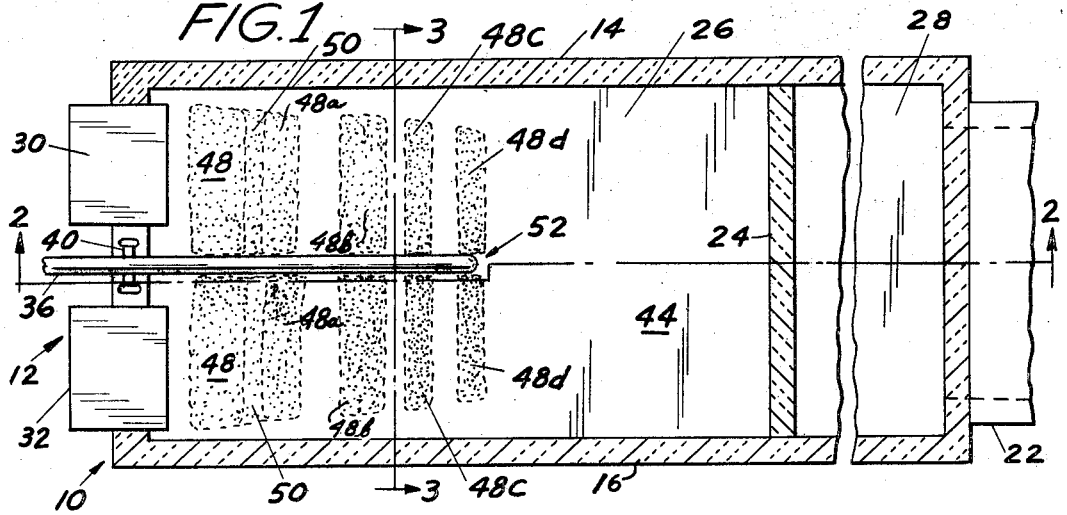
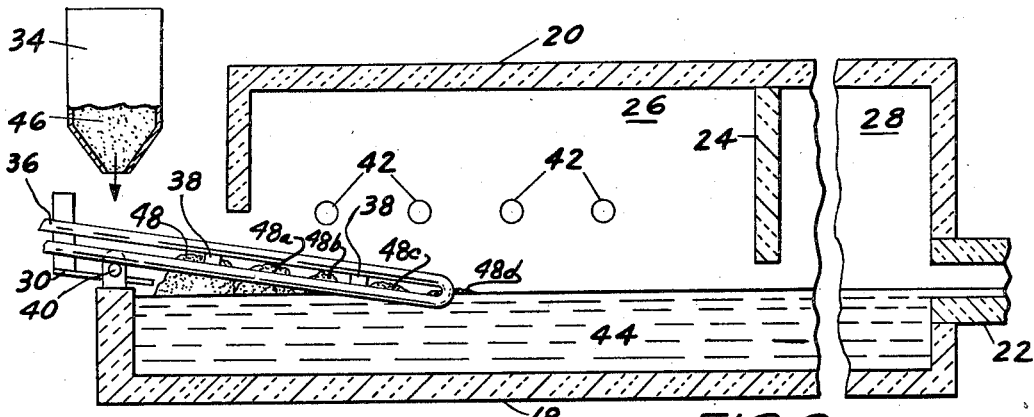
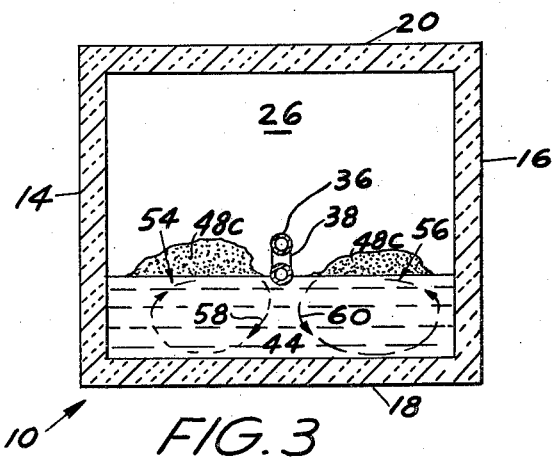
DENNIS C. WEST
INVENTOR.
BY John R. Faulkner
   Glenn S. Arendsen
ATTORNEYS Feb. 17, 1970  D. C. WEST  3,495,966
APPARATUS FOR PRODUCING MOLTEN GLASS WITH
BATH MATERIAL COOLING MEANS
Filed June 21, 1967  2 Sheets-Sheet 2

BY John R. Faulkner
Glenn S. Arendsen

ATTORNEYS

United States Patent Office 3,495,966
Patented Feb. 17, 1970

3,495,966
APPARATUS FOR PRODUCING MOLTEN GLASS
WITH BATH MATERIAL COOLING MEANS
Dennis C. West, Hendersonville, Tenn., assignor to Ford
Motor Company, Dearborn, Mich., a corporation of
Delaware
Filed June 21, 1967, Ser. No. 647,815
Int. Cl. C03b 3/00, 5/22
U.S. Cl. 65—335                                    6 Claims

ABSTRACT OF THE DISCLOSURE

Maintaining the molten glass in the center portion of a glass melting furnace cooler than the surrounding molten glass produces convection currents in the molten glass that tend to draw unmelted glassmaking materials toward the center portion of the furnace. This temperature differential is provided by inserting a cooling coil into the furnace from the feeding end thereof and positioning the cooling coil just below or above the surface of the molten glass, or extending a baffle longitudinally into the heating chamber just above the surface of the molten glass where the baffle reduces heat transfer to the molten glass below the baffle. Logs of unmelted glassmaking material are fed into the furnace on each side of the cooling coil or baffle and convection currents produced in the molten glass by the temperature differential keep the logs away from the furnace side walls.

SUMMARY OF THE INVENTION

In the manufacture of glass, unmelted glassmaking materials comprising scrap glass or cullet and sand, limestone, soda ash, etc., are charged to one end of the melting chamber of a glass melting and refining furnace. Heat supplied to the melting chamber from flames introduced above the materials is transferred to the materials by direct radiation from the flames, indirect radiation from the roof and side walls, and convection from the gaseous atmosphere to establish a bath of molten glass therein. This molten glass eventually passes into the refining chamber of the furnace and then is drawn from the refining chamber for processing in any conventional manner. Melting and refining can be carried out on a batch basis in pot furnaces but preferably is done on a continuing basis in tank furnaces where unmelted glassmaking materials are continuously supplied to the glass melting chamber by floating the materials on an established bath of molten glass and refined molten glass is continuously removed from the refining chamber.

As unmelted glassmaking materials float into the melting chamber in the continuous process, the unmelted materials tend to spread laterally toward the side walls of the melting chamber. Accumulations of the unmelted materials eventually build up on the side walls where the materials disrupt the flow into and through the melting chamber and also remove raw materials from the molten bath, thereby varying bath composition.

In the past, various mechanisims have been provided to mechanically scrape the raw materials from the walls and push the materials into the center portion of the chamber. Alternatively, smaller amounts of raw materials have been fed to the chamber by complicated feeding mechanisms tending to guide the material toward the center portion of the chamber. The mechanical scraping and pushing systems operated intermittently of course and thereby inherently produced variations in the bath composition, while the feeder mechanisms required increased investment for decreased manufacturing rates.

This invention provides a process for producing molten glass on either a batch or continuing basis that maintains the unmelted glassmaking materials in the center portion of the melting chamber without varying bath composition and with a minimum of capital investment and operating expense. The process comprises producing a temperature differential between the molten glass in a portion of the chamber remote from the side walls and the surrounding molten glass so the molten glass in the portion is below the temperature of the surrounding glass. This temperature differential is believed to produce convection flow in the molten glass such that unmelted glassmaking materials tend to move away from the side walls of the chamber toward the central portion.

In the continuous production of molten glass the temperature differential is produced between an imaginary band extending longitudinally into the furnace from the feeder end and the molten glass on each side of the band. A cooling coil can be inserted into the melting chamber from the feeder end to actually remove heat from the molten glass at the surface of the band. This local abstraction of heat at a point remote from the side walls is believed to create a downward flow of molten glass subnatant the solid glassmaking constituents, and this downward flow produces convection currents that counteract any tendency of the constituents to move to the side walls. Alternatively, a baffle can be constructed in the melting chamber to reduce the rate of heat transfer from the flames to the molten glass beneath the baffle. Unmelted glassmaking material is fed into the melting chamber on each side of the band.

BRIEF DESCRIPTION OF THE DRAWINGS

FIGURE 1 is a plan view of a tank-type glass melting and refining furnace producing molten glass on a continuing basis showing a cooling coil inserted into the melting chamber from the feeder end to produce the temperature differential of this invention. FIGURE 2 is a side view taken along line 2—2 of FIGURE 1 showing the vertical relationship of the cooling coil to the molten glass, and FIGURE 3 is an end view taken along line 3—3 of FIGURE 1 showing the convection currents believed to be produced in the molten glass by the cooling coil.

DETAILED DESCRIPTION

Figure 4:
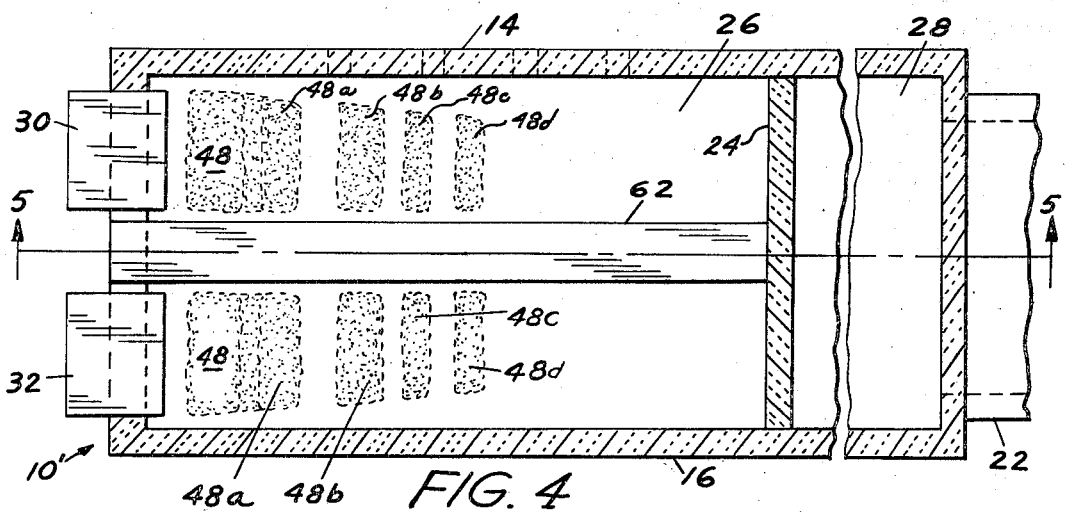
FIGURE 4 is a plan view of an alternate embodiment of this invention where a baffle extends longitudinally through the center portion of the melting chamber.

Referring to FIGURES 1, 2 and 3, a glass melting and refining furnace indicated by the numeral 10 comprises a feeder end 12, side walls 14 and 16, a floor 18, ceiling 20, and exit spout 22. A heat wall 24 extends laterally through the upper part of furnace 10 and divides the furnace into a melting chamber 26 and a refining chamber 28. All walls, the ceiling, and the floor of furnace 10 are made of refractory materials.

At feetder end 12, a movable table 30 is positioned below a hopper 34 (FIGURE 2) and a similar table 32 is positioned below a corresponding hopper (not shown). Between tables 30 and 32, a stainless steel pipe 36 shaped like a hairpin extends longitudinally into melting chamber 26. A plurality of struts 38 is located between the straight sections of pipe 36 to impart additional structural strength thereto. Pipe 36 is mounted on a roller 40 at the feeder end to permit adjustment of its length of projection into the melting chamber.

Outside of furnace 10, pipe 36 is connected to a means (not shown) for circulating a cooling medium through the pipe. Heating means (not shown) of the regenerative type are associated with the furnace to direct flames, usually of burning gases, into the upper portion of the furnace through ports 42 shown in FIGURE 2. Heat also can be transferred to the chambers of the furnace through the side walls and floor but ordinarily the side walls and floor contain cooling pipes to reduce the corrosive effect of the molten glass on the refractory materials.

OPERATION OF FIGURES 1, 2 AND 3

Initially, a bath of molten glass 44 is established in the furnace by slowly heating raw materials. Heat is supplied alternately from each side of the furnace, with the flames and hot gases entering the chamber first through ports 42 for about 30 minutes and then through corresponding ports (not shown) on the opposite side wall for about 30 minutes. After passing across the chamber, the heated gases are conducted through checkerwork associated with the heating means on the opposite side via the ports in the opposite side wall. A great deal of the sensible heat content of the gases is removed by the checkerwork, and is used to preheat gases supplied from the latter side after the changeover.

Once the molten bath is established, continuous operation of the furnace commences by continuously adding unmelted raw materials at the feeder end 12 and continuously removing molten glass from the refining chamber by a spout 22. The unmelted raw materials 46 are measured into hopper 34 and the corresponding hopper (not shown) located above table 32 and metered onto tables 30 and 32 according to the needs of the furnace.

Tables 30 and 32 move the raw material onto the surface of the molten glass in the form of logs 48 connected by a substantially continuous blanket 50 of raw material. As the raw materials move longitudinally into melting chamber 26 the thinner blanket 50 first melts into the pool of molten glass 44, leaving a series of progressively smaller logs 48a, 48b, 48c, and 48d floating into the melting chamber. Eventually, the heat melts the logs into molten glass.

As raw material floats into chamber 26, it tends to move toward side walls 14 and 16. If permitted to reach the side walls, the raw materials stick to the refractory material. Subsequent raw materials build up on the side walls, disrupting the flow of raw materials into the melting chamber and increasing the corrosion and erosion of the side walls.

Locating pipe 36 in the central portion represented by numeral 52 of molten glass 44 counteracts the tendency of the raw materials to move laterally outward toward the side walls. Exactly how this occurs is not known, but it is believed the cooling effect of the pipe locally abstracts heat from the molten glass to produce a temperature differential between the molten glass at the surface of center portion 52 and the surrounding glass represented by numerals 54 and 56 with the molten glass at the surface of portion 52 being cooler than the molten glass in the surrounding portions. This temperature differential is believed to set up convection currents in the molten glass indicated in FIGURE 3 by numerals 58 and 60 and these currents urge the floating unmelted material toward the center portion of chamber 26. An alternate theory is that the temperature differential produces a viscosity increase in the center portion, and this viscosity increase causes sufficient drag on the inner ends of the logs to retain the logs in the center portion.

CONSTRUCTION AND OPERATION OF FIGURES 4 AND 5

Figure 5:
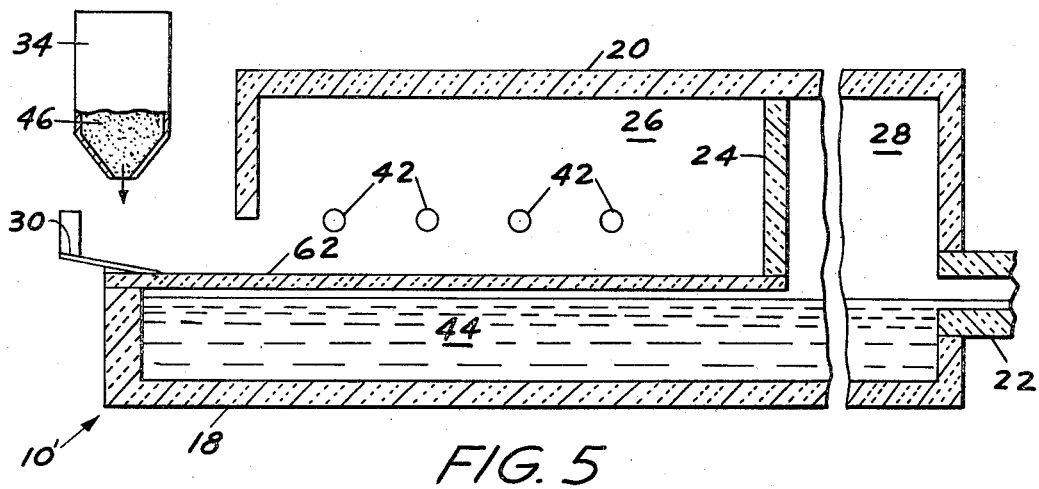
FIGURE 5 is a side view taken along line 5—5 of FIGURE 4 showing the vertical relationship of the baffle to the surface of the molten glass.

Melting and defining furnace 10' shown in FIGURES 4 and 5 is identical to furnace 10 of FIGURES 1, 2 and 3 except that a baffle 62 of refractory material extends longitudinally through melting chamber 26 from feeder end 12 to heat wall 24. Baffle 62 is located between tables 30 and 32 and is just a short distance above the surface of molten glass 44. Typically, baffle 62 is several inches wide and a couple inches thick, with its actual dimensions depending in each case on the size of furnace 10'.

Baffle 62 inhibits heat transfer by radiation from the flames to the molten glass existing beneath the baffle, and also inhibits heat transfer by convection from the gaseous atmosphere to that portion of the molten glass. The reduced heat transfer produces a temperature differential between the molten glass beneath baffle 62 and the molten glass surrounding baffle 62, and this temperature differential acts in the manner described above to maintain unmelted glassmaking materials away from the side walls of the melting chamber.

ADDENDUM

Pipe 36 can be any heat resistant material. Its penetration depth into the molten glass and its protected length into the melting chamber depend on the size of the chamber, the feeding rate, and the heating rate plus several other factors; as a guide, a penetration depth of about six inches and projection of 20 to 30 feet into a melting chamber of approximately 90 feet of a melting and refining furnace 150 feet long, 30 feet wide and containing approximately 1400 tons of molten glass has been found satisfactory. Water serves conveniently as the cooling medium and is circulated through a pipe approximately one inch in diameter at the rate of about 80 gallons per minute. The water temperature rises about 25° F. in traveling through the pipe.

Pipe 36 can be located just above the surface of the molten glass but within the raw materials if desired. Heat transfer from the raw materials to the pipe cools the raw materials which subsequently require more heat from the molten glass in the center portion and thereby produce the temperature differential.

In addition to the hairpin pipe shown, other pipe shapes can be used. For example, a three pipe arrangement in which the pipe ends are connected by an equilateral triangle with water entering through the two lower pipes and leaving by the third pipe has been used.

Baffle 62 can be replaced by any stationary means for maintaining the unmelted materials in the central portion of the melting chamber. For example, a picket fence type of construction can be used to reduce heat transfer to the molten glass in the central portion of the melting chamber. The projected length of the baffle into the melting chamber also depends on various factors and must be determined empirically. Recuperative heating means can be used in place of the more widely used regenerative means described.

Thus this invention provides a glass melting furnace with a stationary means for maintaining unmelted glassmaking materials floating on the bath of molten glass away from the furnace side walls. Obviously, the means is inexpensive, operates continuously and requires virtually no maintenance. Experimental use has verified the effectiveness of the cooling coil in counteracting the tendency of the unmelted materials from floating toward furnace side walls under actual operating conditions.

I claim:
1. A glass melting furnace comprising walls forming a melting chamber, an inlet for charging unmelted glassmaking materials to the melting chamber, an outlet for removing molten glass from the melting chamber, charging means in said inlet for supplying unmelted glassmaking materials to the chamber, and means extending into the central portion of the melting chamber from the inlet and located proximate to the surface of the molten glass therein for reducing the temperature of the molten glass in the central portion below the temperature of the molten glass near the walls whereby unmelted glassmaking materials are maintained away from the walls of the melting chamber.

2. The furnace of claim 1 in which the means for reducing the temperature of the molten glass in the central portion is a hairpin shaped pipe projecting into the chamber from the inlet side of the chamber, and comprising means for circulating a cooling medium through said pipe.

3. The furnace of claim 2 in which the pipe is stainless steel and the cooling medium is water.

4. The furnace of claim 1 comprising heating means for producing hot gases above the molten glass and the unmelted glassmaking materials in the melting chamber and in which said means for reducing the temperature of the molten glass in the central portion comprises a baffle extending longitudinally into the melting chamber from the inlet, said baffle being located slightly above the surface of the molten glass, said baffle reducing heat transfer from hot gases in the furnace to the glass beneath the baffle so the glass beneath the baffle has a temperature below the temperature of the glass near the walls whereby unmelted glassmaking materials are maintained away from the walls of the melting chamber.

5. The furnace of claim 4 comprising means for feeding unmelted glassmaking materials into the heating chamber on each side of the baffle.

6. The furnace of claim 1 comprising means for feeding unmelted glassmaking materials into the heating chamber on each side of the means for reducing the temperature of the molten glass in the central portion.

References Cited

UNITED STATES PATENTS

| | | | |
|---|---|---|---|
| 1,554,268 | 9/1925 | Ferngren | 65—137 |
| 1,923,942 | 8/1933 | Lufkin | 65—137 |
| 2,119,948 | 6/1938 | Blau et al. | 65—134 |
| 2,119,947 | 6/1938 | Blau et al. | 65—134 |
| 3,248,203 | 4/1966 | Cunningham | 65—346 XR |
| 3,305,340 | 2/1967 | Atkeson | 65—134 |

FRANK W. MIGA, Primary Examiner

U.S. Cl. X.R.

65—134, 137, 337, 345, 346